US012752519B2

(12) United States Patent
Alnaser et al.

(10) Patent No.: US 12,752,519 B2
(45) Date of Patent: Oct. 6, 2026

(54) BINDER-FREE MULTIFUNCTIONAL GARMENTS WITH TUNABLE SURFACE PROPERTIES FOR WEARABLE PROTECTION

(71) Applicant: KING SAUD UNIVERSITY, Riyadh (SA)

(72) Inventors: Ibrahim Abdullah Alnaser, Riyadh (SA); Mohammad Rezaul Karim, Riyadh (SA); Muhammad Omer Aijaz, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/768,574

(22) Filed: Jul. 10, 2024

(65) Prior Publication Data

US 2026/0014781 A1 Jan. 15, 2026

(51) Int. Cl.
*B32B 27/08* (2006.01)
*B32B 5/26* (2006.01)
(Continued)

(52) U.S. Cl.
CPC .............. *B32B 27/08* (2013.01); *B32B 5/266* (2021.05); *B32B 27/20* (2013.01); *B32B 27/36* (2013.01);
(Continued)

(58) Field of Classification Search
CPC ..... B32B 5/26; B32B 5/266; B32B 2307/728; B32B 2250/03; B32B 2250/20; B32B 5/267; B32B 5/271; D04H 7/728
See application file for complete search history.

(56) References Cited

U.S. PATENT DOCUMENTS 5,134,025 A * 7/1992 Zenda .................. D06N 3/0043 428/327
2007/0269496 A1* 11/2007 Gamble .................. A61P 17/16 424/59
(Continued)

FOREIGN PATENT DOCUMENTS

CN 105727346 A * 7/2016 ............. A61L 15/44
CN 109130411 A 1/2019
(Continued)

OTHER PUBLICATIONS

Machine translation of KR20220102875A, Powered by EPO and Google. (Year: 2022).*
(Continued)

*Primary Examiner* — Monique R Jackson
(74) *Attorney, Agent, or Firm* — Nath, Goldberg & Meyer; Joshua B Goldberg

(57) ABSTRACT

The multifunctional fabric for garments is a fabric for making protective garments. The multifunctional fabric includes first, second and third layers. The first layer is an outer layer and is formed from a superhydrophobic polymer, such as polylactic acid, with ultraviolet-reflective nanoparticles embedded therein. The second layer is a middle layer and is formed from a first superhydrophilic polymer with silver nanoparticles embedded therein. The third layer, which is an inner layer, is formed from a second superhydrophilic polymer with silver nanoparticles embedded therein. The second layer is sandwiched between the first and third layers, and each of the first, second and third layers is porous to make the fabric breathable. The first and second superhydrophilic polymers allow for absorption of perspiration and the silver nanoparticles embedded therein provide antimicrobial neutralization of any odors caused by the
(Continued)

absorbed perspiration, and further serve to reflect infrared radiation from the external environment.

9 Claims, 4 Drawing Sheets

(51) Int. Cl.
*B32B 27/20* (2006.01)
*B32B 27/36* (2006.01)

(52) U.S. Cl.
CPC ....... *B32B 2250/03* (2013.01); *B32B 2250/24* (2013.01); *B32B 2260/025* (2013.01); *B32B 2260/046* (2013.01); *B32B 2264/1021* (2020.08); *B32B 2264/1022* (2020.08); *B32B 2264/1025* (2020.08); *B32B 2264/1051* (2020.08); *B32B 2264/30* (2020.08); *B32B 2307/416* (2013.01); *B32B 2307/7145* (2013.01); *B32B 2307/728* (2013.01); *B32B 2437/00* (2013.01)

(56) References Cited

U.S. PATENT DOCUMENTS

| | | | | |
|---|---|---|---|---|
| 2008/0299160 | A1* | 12/2008 | Agboh | D01F 1/103<br>424/641 |
| 2018/0338865 | A1* | 11/2018 | Hochi | B32B 27/00 |
| 2022/0095626 | A1 | 3/2022 | Fan et al. | |
| 2023/0173786 | A1 | 6/2023 | Queiroga et al. | |

FOREIGN PATENT DOCUMENTS

| | | | | | |
|---|---|---|---|---|---|
| CN | 110269749 | B | | 8/2020 | |
| CN | 112519377 | A | | 3/2021 | |
| KR | 20220102875 | A | * | 7/2022 | |
| WO | WO-9842909 | A1 | * | 10/1998 | D06M 11/44 |
| WO | WO-2023130159 | A1 | * | 7/2023 | A61F 13/15268 |

OTHER PUBLICATIONS

Machine translation of CN105727346A, published Jul. 2016, Powered by EPO and Google. (Year: 2016).*

Otitoju, Superhydrophilic (superwetting) surfaces: A review on fabrication and application, 2017, Journal of Industrial and Engineering Chemistry 47, pp. 19-40. (Year: 2017).*

Drelich, Superhydrophilic and Superwetting Surfaces: Definition and Mechanisms of Control, 2010, Langmuir 26 (24), pp. 18621-18623. (Year: 2010).*

Aijaz, Developing novel multifunctional protective clothes for disabled individuals using bio-based electrospun nanofibrous membranes, available online Jul. 1, 2024, International Journal of Biological Macromolecules 275, 113598, 11 pages. (Year: 2024).*

Aijaz, Silica NPs in PLA-Based Electrospun Nanofibrous Non-Woven Protective Fabrics with Dual Hydrophilicity/Hydrophobicity, Breathability, and Thermal Insulation Characteristics for Individuals with Disabilities, Oct. 2023, Polymers 15, 4139, 13 pages. (Year: 2023).*

Meng, Xu, et al. "Preparation and Performance of Cotton Fabric with Antibacterial and Hydrophobic Properties Based on Click Reaction." The Journal of Cotton Science 27:52-59 (2023).

* cited by examiner

BINDER-FREE MULTIFUNCTIONAL GARMENTS WITH TUNABLE SURFACE PROPERTIES FOR WEARABLE PROTECTION

BACKGROUND

Field

The disclosure of the present patent application relates to fabrics, and particularly to a multifunctional fabric for garments providing protection against microbial growth, ultraviolet radiation and liquids from the external environment. In general, achieving multifunctional textiles requires the use of multiple materials and binders. However, this study proposes a simple approach utilizing a single core polymer. By utilizing its glass transition temperature, multiple functional layers can be easily bound together, eliminating the need for additional binding agents

Description of Related Art

Although a wide variety of protective garments are available, such garments typically only provide a single type of protection or property. For example, waterproof garments typically do not also provide antimicrobial and ultraviolet protection. Such garments are also typically not made from breathable fabrics. As another example, fabrics designed to wick moisture from a wearer's body are not typically simultaneously waterproof, providing protection from, for example, rain.

In a wide variety of fields, ranging from outdoor workers to soldiers, garments which offer protection from a variety of environmental hazards, as well as being comfortable, are required. Rather than wearing multiple layers of clothing, where each offers a different type of protection, a single fabric with multiple benefits would allow for greater mobility and comfort for the wearer. Thus, a multifunctional fabric for garments solving the aforementioned problems is desired.

SUMMARY

The multifunctional fabric for garments is a fabric for making protective garments, such as, but not limited to, hats, undergarments, shirts, jackets, adult diapers, military uniforms, tactical garments and the like. The multifunctional fabric includes first, second and third layers. The first layer is an outer layer and is formed from a superhydrophobic polymer, such as polylactic acid, with silica (i.e., silicon dioxide) nanoparticles embedded therein. The second layer is a middle layer and is formed from a first superhydrophilic polymer with silver nanoparticles embedded therein. The third layer, which is an inner layer, is formed from a second superhydrophilic polymer with silver nanoparticles embedded therein. The second layer is sandwiched between the first and third layers, and each of the first, second and third layers is porous to make the fabric breathable.

The superhydrophobic polymer and the embedded fumed silica nanoparticles of the first outer layer prevent absorption of liquids from the external environment and may provide a protective barrier against certain chemical and/or biological agents. Additionally, the silica nanoparticles are reflective to ultraviolet radiation, thus providing protection for the wearer's skin from ultraviolet exposure. Alternatively, or in addition to the silica nanoparticles, the nanoparticles embedded in the first layer may be titanium oxide nanoparticles, zinc oxide nanoparticles or a combination thereof. The pores formed through the first, second and third layers are sized to allow the flow of air but are small enough to prevent the passage of liquid therethrough.

The first and second superhydrophilic polymers of the second and third layers, respectively, may be the same hydrophilic polymer or may be different hydrophilic polymers. In certain embodiments, one or more of the hydrophilic polymers can be moisture-wicking hydrophilic polymers. Non-limiting examples of the moisture-wicking hydrophilic polymers include, but are not limited to, polyester and nylon. The hydrophilic nature of the polymer(s) allows for absorption of perspiration and the silver nanoparticles embedded therein provide antimicrobial neutralization of any odors caused by the absorbed perspiration. The embedded silver nanoparticles further serve to reflect infrared radiation from the external environment in order to keep the wearer cool. The silver nanoparticles may also reflect ultraviolet radiation, protecting the wearer's skin from ultraviolet exposure, and may also act to neutralize certain biological and/or chemical agents.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
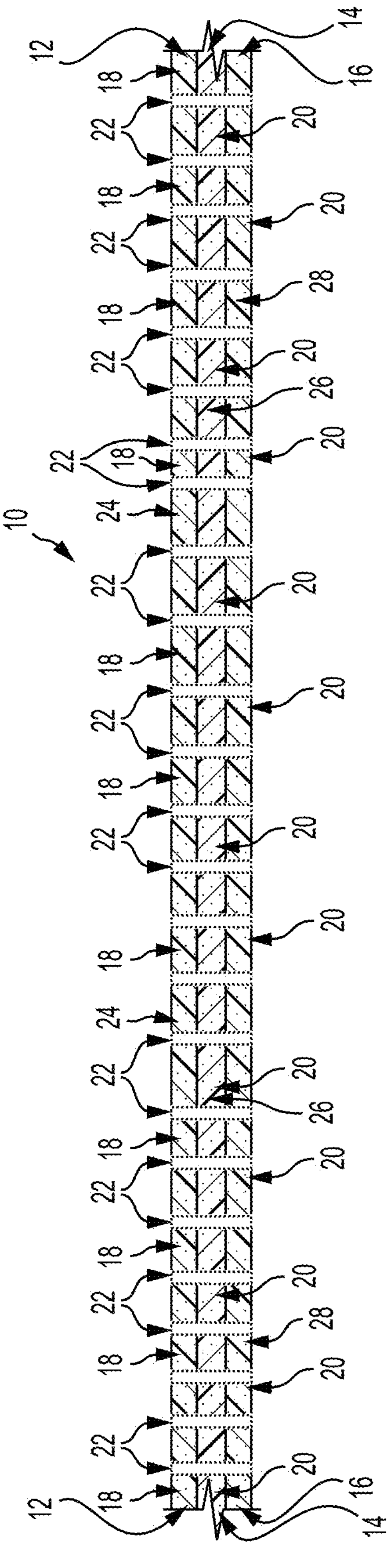
FIG. 1 is a side view in section of a multifunctional fabric for garments.

The multifunctional fabric for garments is a fabric for making protective garments, such as, but not limited to, hats, undergarments, shirts, jackets, adult diapers, military uniforms, tactical garments and the like. As shown in FIG. 1, the multifunctional fabric 10 includes first, second and third layers 12, 14, 16, respectively. It should be understood that the relative thicknesses of first, second and third layers 12, 14, 16 are exaggerated in FIG. 1 for purposes of illustration and clarity. The first layer 12 is an outer layer and is formed from a superhydrophobic polymer 24, such as polylactic acid, with fumed silica (i.e., silicon dioxide) nanoparticles 18 embedded therein. The second layer 14 is a middle layer and is formed from a first superhydrophilic polymer 26 with silver nanoparticles 20 embedded therein. The third layer 16, which is an inner layer, is formed from a second superhydrophilic polymer 28 with silver nanoparticles 20 embedded therein. The second layer 14 is sandwiched between the first and third layers 12, 16, respectively, and each of the first, second and third layers 12, 14, 16 is porous to make the fabric breathable. It should be understood that the relative diameters of pores 22 are exaggerated in FIG. 1 for purposes of illustration and clarity. It should be further understood that the distribution of pores 22 is shown for exemplary purposes only.

The superhydrophobic polymer 24 and the embedded silica nanoparticles 18 of the first outer layer 12 prevent absorption of liquids from the external environment and may provide a protective barrier against certain chemical and/or biological agents. Additionally, the silica nanoparticles 18 are reflective to ultraviolet radiation, thus providing protection for the wearer's skin from ultraviolet exposure. Alternatively, or in addition to the silica nanoparticles 18, the nanoparticles embedded in the first layer 12 may be titanium oxide nanoparticles, zinc oxide nanoparticles or a combination thereof. The pores 22 formed through the first, second and third layers 12, 14, 16 are sized to allow the flow of air but are small enough to prevent the passage of liquids therethrough.

The first and second superhydrophilic polymers 26, 28 of the second and third layers 14, 16, respectively, may be the same hydrophilic polymer or may be different hydrophilic polymers. In certain embodiments, one or more of the hydrophilic polymers can be moisture-wicking hydrophilic polymers. Non-limiting examples of moisture-wicking hydrophilic polymers which may be used include, but are not limited to, polyester and nylon. The superhydrophilic nature of the polymer(s) 26, 28 allows for absorption of perspiration from the wearer and the silver nanoparticles 20 embedded therein provide antimicrobial neutralization of any odors caused by the absorbed perspiration. The antimicrobial action may also be effective against contamination from external biological and/or chemical agents and contaminants. The embedded silver nanoparticles 20 further serve to reflect infrared radiation from the external environment in order to keep the wearer cool. The silver nanoparticles 20 may also reflect ultraviolet radiation, protecting the wearer's skin from ultraviolet exposure.

Figures 2A, 2B:
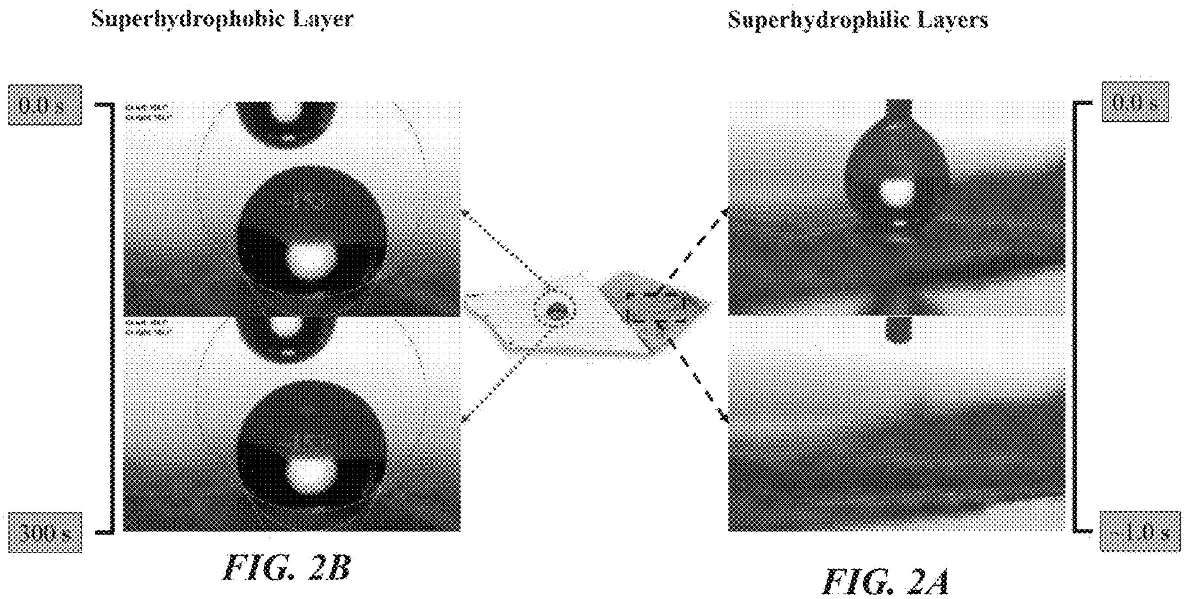
FIG. 2A shows water droplet absorption testing over a period of one second for a superhydrophilic surface of the multifunctional fabric for garments.
FIG. 2B shows water droplet absorption testing over a period of 300 seconds for a superhydrophobic surface of the multifunctional fabric for garments.

It should be understood that any suitable method may be used to form the first, second and third layers 12, 14, 16, respectively, including, but not limited to, electrospinning, melt-blowing, phase separation, template methods, fiber fibrillation, and phase separation. For purposes of testing, a non-woven sample of the multifunctional fabric 10 was prepared using electrospinning. The nanoparticles 18 in the first layer 12 were silicon dioxide nanoparticles in the samples. FIGS. 2A and 2B show the results of water droplet testing. FIG. 2A shows a water droplet placed on superhydrophilic third layer 16. The surface angle of the water droplet absorbed completely in less than a second, reaching approximately 0°, which enabled the rapid attraction of water molecules. This phenomena of superhydrophilicity layers facilitates the absorption of perspiration from the skin, thereby inhibiting bacterial proliferation. FIG. 2B shows a water droplet placed on the superhydrophobic first layer 12. Measurements of contact angle (CA) were taken at zero seconds and 300 seconds. As shown in FIG. 2B, the contact angle remained constant at 153° between zero and 300 seconds; i.e., there was no absorption of the water droplet over the entire 300 second testing period. All testing was performed at room temperature.

Figure 3A:
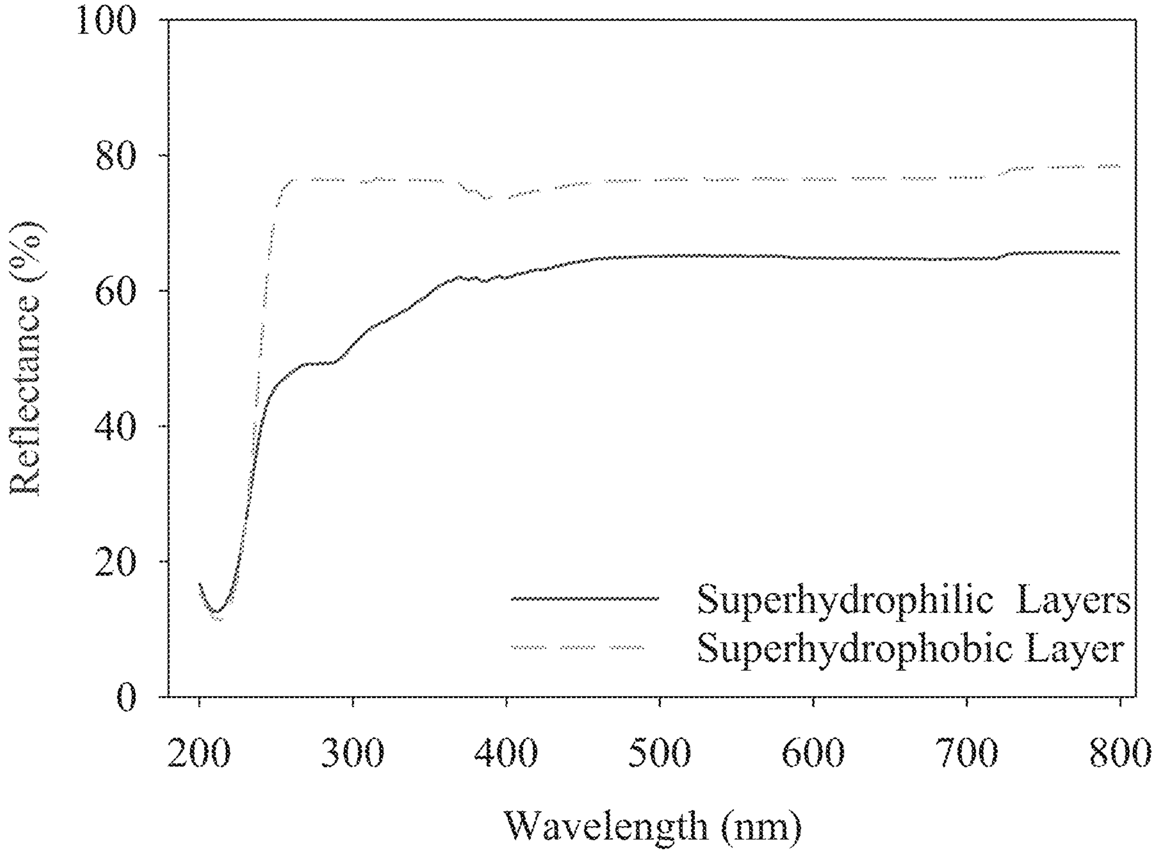
FIG. 3A is a graph comparing ultraviolet (UV) and visible light reflectance for the superhydrophilic and superhydrophobic surfaces of the multifunctional fabric for garments.
Figure 3B:
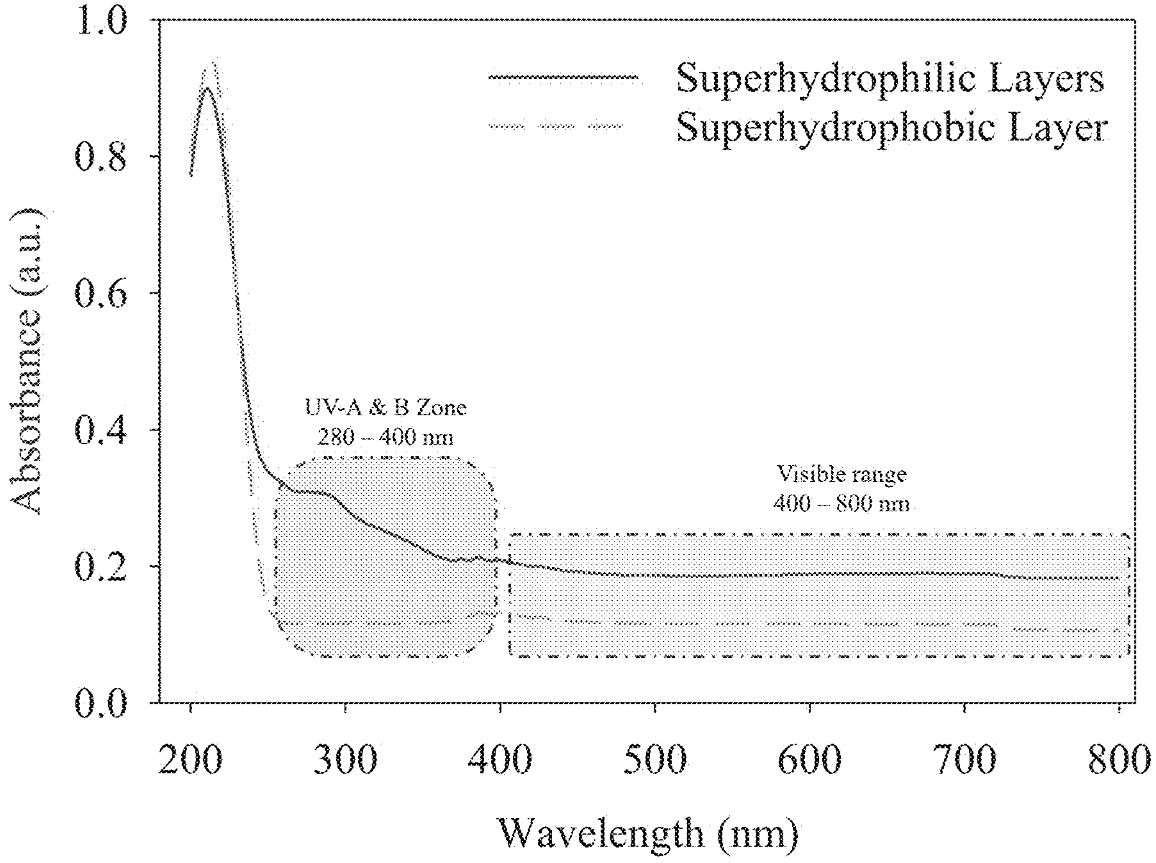
FIG. 3B is a graph comparing ultraviolet (UV) and visible light absorption for the superhydrophilic and superhydrophobic surfaces of the multifunctional fabric for garments.

Testing was also performed for optical reflectance of absorption of ultraviolet light and visible light ranging between wavelengths from 200 nm to 800 nm. As shown in FIGS. 3A and 3B, for the first superhydrophobic layer 12, containing $SiO_2$ nanoparticles demonstrated excellent blockage of UV light in both zones; average reflectance of UVA radiation (315-400 nm) was about 74% and average reflectance of UVB radiation (280-315 nm) was about 76%. For the second and third layers 14, 16, with the embedded silver nanoparticles, average reflectance of UVA radiation was about 50% and average reflectance of UVB radiation was about 60%. In the visible wavelength range (400-800 nm), average reflectance of the first superhydrophobic layer 12 was about 78%, and average reflectance of the second and third layers 14, 16 was about 65%. As demonstrated by the absorbance curves in FIG. 3B, both the inner and outer sides of the fabric 10 almost completely filtered out ultraviolet light.

As shown in Table 1 below, the efficacy of first, second and third layers 12, 14, 16 at inhibiting microbial growth were also tested and compared against the antibiotic kanamycin and a blank disc, serving as a control sample. As shown in Table 1, testing was performed against *Streptococcus mutans, Staphylococcus aureus, Streptococcus pneumonia*, and *Bacillus subtilis* as Gram-positive bacterial strains. Testing was also performed against *Klebsiella pneumoniae* as a Gram-negative bacterial strain. The concentration of nanoparticles in each layer was 10 µg/mL. The kanamycin was also tested at a concentration of 10 µg/mL. Each microbial strain's pure colonies were selected and cultured in Mueller Hinton broth for 24 hours at 37° C. On the Mueller Hinton agar plates, 0.5 McFarland standard cultures were prepared. Freshly prepared layers 12, 14, 16 and standard kanamycin were loaded on discs and placed on the agar plates. One blank disc served as the negative control sample. After incubation for 24 hours, the zone of inhibition was measured. The experiments were carried out in triplicate.

TABLE 1

Zone of inhibition for each sample (mean ± SD, n = 3)

| Sample | Zone of inhibition (mm) ± SD | | | | |
|---|---|---|---|---|---|
| | *B. subtilis* | *S. pneumoniae* | *S. aureus* | *S. mutans* | *K. pneumoniae* |
| $1^{st}$ layer | 18.87 ± 2.63 | 19.67 ± 2.11 | 19.53 ± 2.01 | 19.17 ± 2.88 | 17.70 ± 2.11 |
| $2^{nd}$ layer | 17.73 ± 2.08 | 17.50 ± 0.70 | 17.87 ± 1.84 | 17.77 ± 1.05 | 18.93 ± 1.47 |
| $3^{rd}$ layer | 13.57 ± 0.93 | 12.30 ± 0.44 | 13.63 ± 1.80 | 12.40 ± 0.89 | 10.13 ± 1.60 |
| Kanamycin | 23.67 ± 0.91 | 23.83 ± 1.50 | 25.07 ± 1.27 | 23.77 ± 0.91 | 25.93 ± 1.27 |
| Blank | 6.97 ± 0.47 | 6.80 ± 0.26 | 7.30 ± 0.36 | 7.00 ± 0.44 | 6.80 ± 0.3 |

It is to be understood that the multifunctional fabric for garments is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A multifunctional fabric for garments, comprising:

a first layer comprising polylactic acid with silica nanoparticles embedded therein;

a second layer comprising a first hydrophilic polymer with antimicrobial silver nanoparticles embedded therein; and a third layer comprising a second hydrophilic polymer with silver nanoparticles embedded therein, wherein the second layer is sandwiched between the first and third layers therein, the first layer having an average reflectance of UVA radiation of about 50% and having an average reflectance of UVB radiation of about 60%, wherein the first, second, and third layers are prepared using electrospinning, and wherein the first layer provides a protective barrier against chemical and biological agents.

2. The multifunctional fabric for garments as recited in claim 1, wherein each of the first, second, and third layers is porous.

3. The multifunctional fabric for garments as recited in claim 1, wherein the first hydrophilic polymer and the second hydrophilic polymer are identical.

4. The multifunctional fabric for garments as recited in claim 1, wherein the first hydrophilic polymer and the second hydrophilic polymer are dissimilar.

5. A multifunctional fabric for garments, comprising:

a first layer comprising polylactic acid with ultraviolet-reflective nanoparticles embedded therein;

a second layer comprising a first hydrophilic polymer with silver nanoparticles embedded therein; and a third layer comprising a second hydrophilic polymer with silver nanoparticles embedded therein, wherein the second layer is sandwiched between the first and third layers, the second layer and third layers each having an average reflectance of UVA radiation of about 78% and an average reflectance of UVB radiation of about 74%, wherein the first, second, and third layers are prepared using electrospinning, and wherein the first layer provides a protective barrier against chemical and biological agents.

6. The multifunctional fabric for garments as recited in claim 5, wherein each of the first, second, and third layers is porous.

7. The multifunctional fabric for garments as recited in claim 5, wherein the first superhydrophilic polymer and the second hydrophilic polymer are identical.

8. The multifunctional fabric for garments as recited in claim 5, wherein the first hydrophilic polymer and the second hydrophilic polymer are dissimilar.

9. The multifunctional fabric for garments as recited in claim 5, wherein the ultraviolet-reflective nanoparticles are selected from the group consisting of titanium oxide nanoparticles, zinc oxide nanoparticles, silicon oxide nanoparticles, and combinations thereof.

* * * * *